(12) United States Patent
Abraham (10) Patent No.: US 9,084,115 B2
(45) Date of Patent: Jul. 14, 2015

(54) SYSTEM AND METHOD FOR DATA VERIFICATION USING A SMART PHONE

(71) Applicant: Dennis Thomas Abraham, Secaucus, NJ (US)

(72) Inventor: Dennis Thomas Abraham, Secaucus, NJ (US)

( * ) Notice: Subject to any disclaimer, the term of this patent is extended or adjusted under 35 U.S.C. 154(b) by 87 days.

(21) Appl. No.: 13/970,773

(22) Filed: Aug. 20, 2013

(65) Prior Publication Data

US 2014/0335824 A1    Nov. 13, 2014

Related U.S. Application Data

(60) Provisional application No. 61/822,480, filed on May 13, 2013.

(51) Int. Cl.
| | | |
|---|---|---|
| *H04W 12/00* | (2009.01) | |
| *H04W 12/06* | (2009.01) | |
| *H04W 8/16* | (2009.01) | |
| *H04L 29/06* | (2006.01) | |
| *H04W 4/00* | (2009.01) | |

(52) U.S. Cl.
CPC ........... *H04W 12/06* (2013.01); *H04L 63/0861* (2013.01); *H04W 4/008* (2013.01)

(58) Field of Classification Search
CPC ....... H04W 12/00; H04W 8/16; H04W 12/06; H04W 12/08; H04B 5/02
USPC ................................. 455/41.1, 411
See application file for complete search history.

(56) References Cited

U.S. PATENT DOCUMENTS

| | | |
|---|---|---|
| 6,219,793 B1 | 4/2001 | Li |
| 7,941,197 B2 | 5/2011 | Jain |
| 8,145,915 B2 | 3/2012 | Milgramm |
| 2005/0250472 A1 | 11/2005 | Silvester |
| 2011/0302420 A1* | 12/2011 | Davida .......................... 713/180 |
| 2012/0028609 A1 | 2/2012 | Hruska |
| 2012/0084206 A1 | 4/2012 | Mehew |
| 2012/0110341 A1 | 5/2012 | Beigi |
| 2012/0144203 A1* | 6/2012 | Albisu .......................... 713/184 |
| 2012/0150742 A1 | 6/2012 | Poon |
| 2012/0233705 A1* | 9/2012 | Boysen et al. .................. 726/29 |
| 2012/0268248 A1 | 10/2012 | Hiraide |
| 2013/0023240 A1 | 1/2013 | Weiner |
| 2013/0036459 A1 | 2/2013 | Liberman |
| 2013/0081119 A1 | 3/2013 | Sampas |
| 2014/0214673 A1* | 7/2014 | Baca et al. ...................... 705/44 |

* cited by examiner

*Primary Examiner* — Kashif Siddiqui
*Assistant Examiner* — Obidon Bassinan
(74) *Attorney, Agent, or Firm* — Neustel Law Offices (57) ABSTRACT

A system and method for data verification using a smart phone which verifies data and biometric identity information using only locally stored biometric information. The system and method for data verification using a smart phone generally includes a mobile device, a central validating server, and an activation client. The validating server and activation client are utilized upon initial activation of the mobile device to verify data information (i.e. name, date of birth, social security number, etc.) and/or biometric data regarding an individual and then flag the mobile device as activated and verified. The biometric data is not stored in any location other than the memory of the mobile device. The activated and verified mobile device may then be utilized in combination with a wide range of verification clients to easily verify data information and/or biometric data of an individual.

9 Claims, 6 Drawing Sheets

SYSTEM AND METHOD FOR DATA VERIFICATION USING A SMART PHONE

CROSS REFERENCE TO RELATED APPLICATIONS

I hereby claim benefit under Title 35, United States Code, Section 119(e) of U.S. provisional patent application Ser. No. 61/822,480 filed May 13, 2013. The 61/822,480 application. The 61/822,480 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a smart phone data verification system and more specifically it relates to a system and method for data verification using a smart phone which verifies data and biometric identity information using only locally stored biometric information.

2. Description of the Related Art

Any discussion of the related art throughout the specification should in no way be considered as an admission that such related art is widely known or forms part of common general knowledge in the field.

Mobile devices such as smart phones are increasingly including biometric scanners such as fingerprint scanners in their hardware. Additionally, larger proportions of our population utilize such mobile devices on a day-to-day basis. However, mobile devices have, as of yet, not become standard for use in verifying data information to replace various identification cards and the like which are traditionally carried in a wallet or purse.

Thus, individuals in present times are still using antiquated methods of verification which are too commonly susceptible to counterfeit (i.e. identity theft through social security number theft). The slow rate of adoption of these new technologies may stem from the individual's reluctance to have biometric information stored on a third party server, particularly in light of the potential for misuse of that information by third parties.

Because of the inherent problems with the related art, there is a need for a new and improved system and method for data verification using a smart phone which verifies data and biometric identity information using only locally stored biometric information.

BRIEF SUMMARY OF THE INVENTION

The invention generally relates to a data verification system which includes a mobile device, a central validating server, and an activation client. The validating server and activation client are utilized upon initial activation of the mobile device to verify data information (i.e. name, date of birth, social security number, etc.) and/or biometric data regarding an individual and then flag the mobile device as activated and verified. The biometric data is not stored in any location other than the memory of the mobile device. The activated and verified mobile device may then be utilized at a wide range of verification clients to easily verify data information and/or biometric data of an individual. For example, the activated mobile phone may be utilized to easily verify the age of the owner prior to admission to a bar, wherein the bar has its own verification client (i.e. handheld scanner).

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview of Invention

FIGS. 1 through 6 illustrate the present invention. The system and method for data verification using a smart phone generally includes a mobile device 30, a central validating server 20, and an activation client 40. The validating server 20 and activation client 40 are utilized upon initial activation of the mobile device 30 to verify data information (i.e. name, date of birth, social security number, etc.) and/or biometric data regarding an individual and then flag the mobile device 30 as activated and verified. The biometric data is not stored in any location other than the memory of the mobile device 30. The activated and verified mobile device 30 may then be utilized at a wide range of verification clients 50 to easily verify data information and/or biometric data of an individual. For example, the activated mobile phone may be utilized to easily verify the age of the owner prior to admission to a bar, wherein the bar has its own verification client 50 (i.e. handheld scanner).

B. Exemplary Communication Networks

The present invention may be utilized upon any telecommunications network 12 capable of transmitting data including voice data and other types of electronic data. Examples of suitable telecommunications networks 12 for the present invention include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The present invention may communicate via a single telecommunications network 12 or multiple telecommunications networks 12 concurrently. Various protocols may be utilized by the electronic devices for communications such as but not limited to HTTP, SMTP, FTP and WAP (wireless Application Protocol). The present invention may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The present invention may also be utilized with online services and internet service providers.

The Internet is an exemplary telecommunications network 12 for the present invention. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Validating Server

The central validating server 20 may be comprised of any central communication site where communications are preferably established with for initial validation purposes upon activation of the mobile device 30. The central validating server 20 may be comprised of a server computer, cloud based computer, virtual computer, home computer or other computer system capable of receiving and transmitting data via IP networks and the telecommunication networks 12. As can be appreciated, a modem or other communication device may be required between each of the central communication units and the corresponding telecommunication networks 12. The central communication unit may be comprised of any electronic system capable of receiving and transmitting information (e.g. voice data, computer data, etc.).

Figure 1:
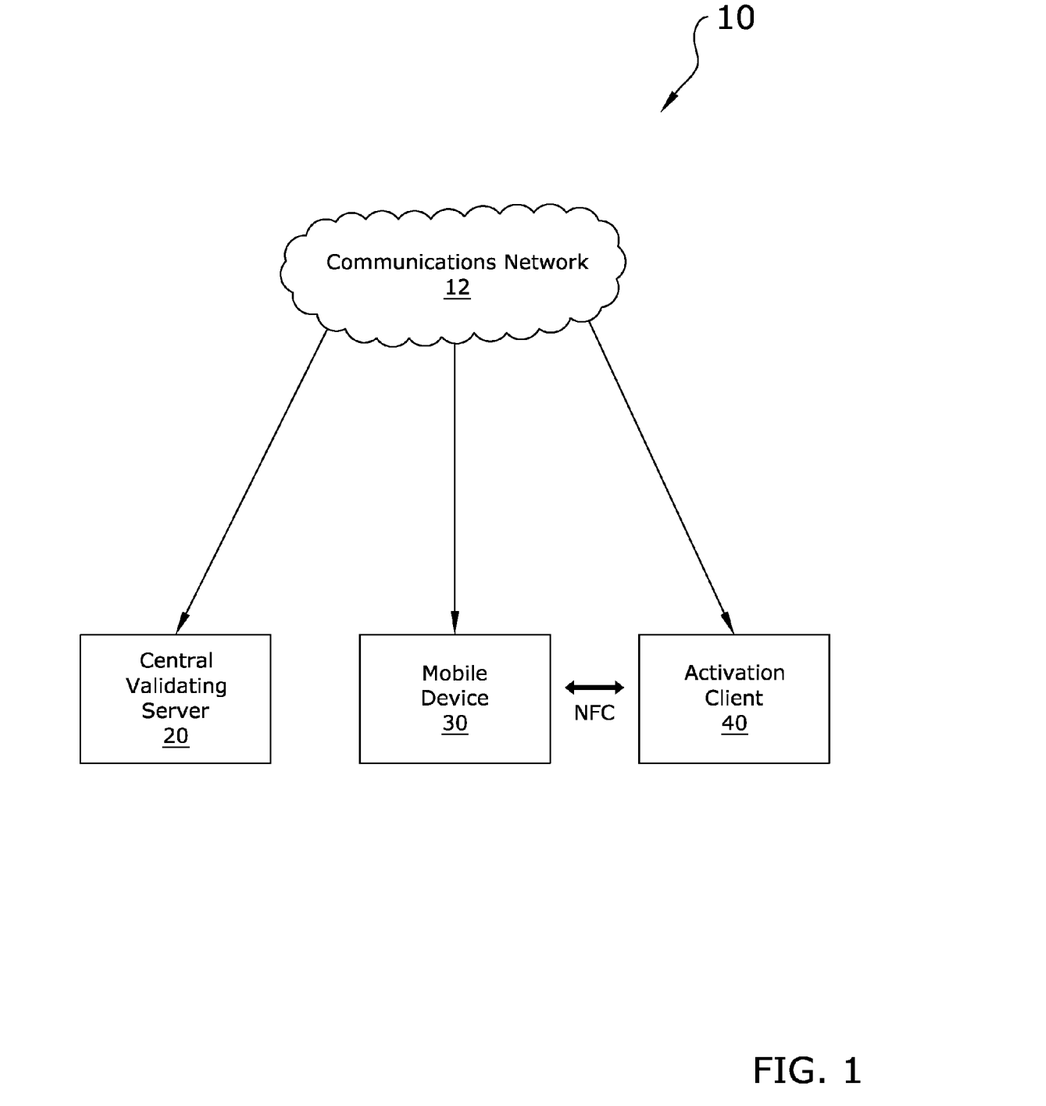
FIG. 1 is a block diagram of the activation system of the present invention.
Figure 2:
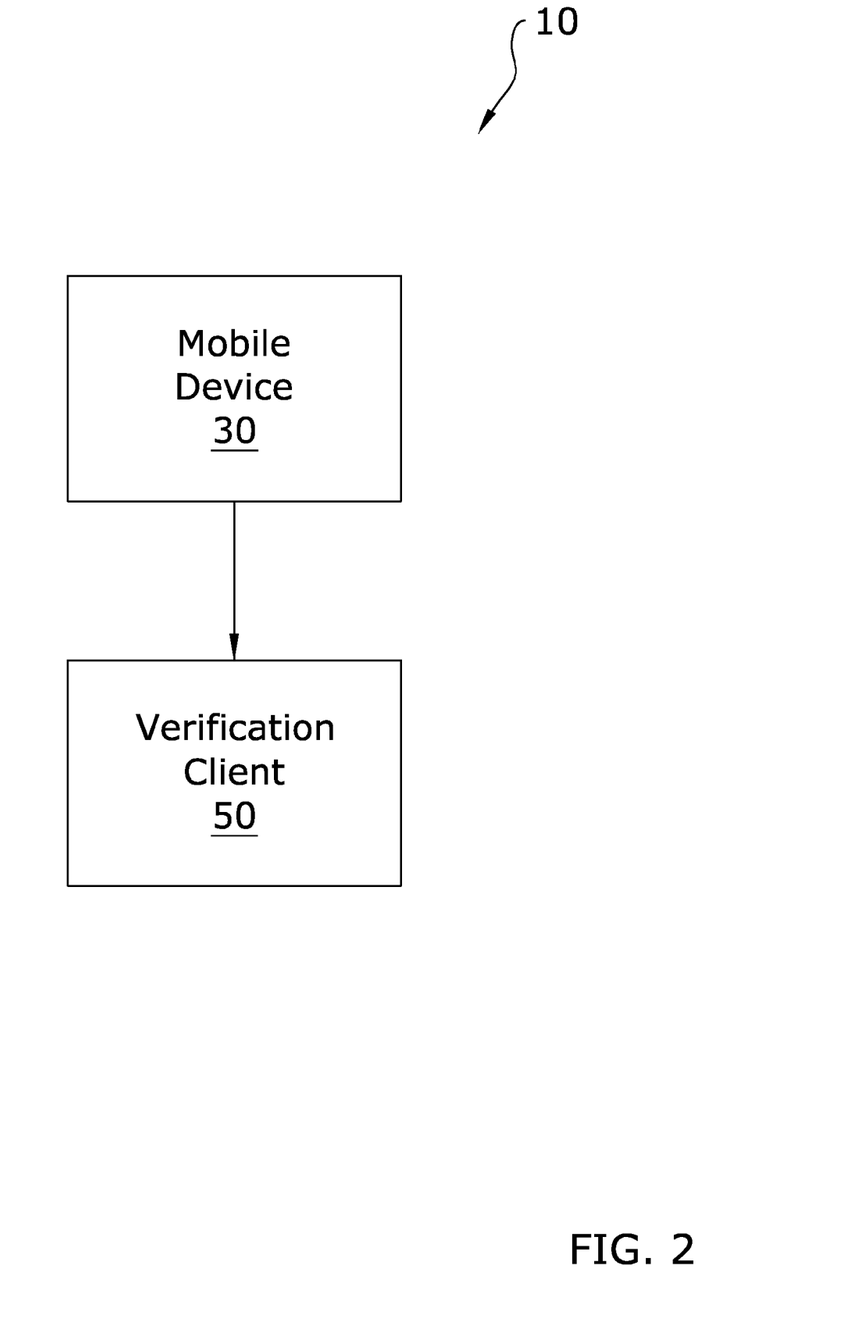
FIG. 2 is a block diagram of the verification system of the present invention.

As shown in FIG. 1, the central validating server 20 is preferably comprised of an off-location computing device (such as a server computer) which is adapted to transmit and receive data with both the activation client 40 and the mobile device 30 of the present invention via the communications network 12. The central validating server 20 may be implemented across multiple devices or may be comprised of a single computing device. In embodiments implementing the central validating server 20 across multiple devices, those devices may themselves be interconnected via a communications network 12.

The central validating server 20 will be adapted to communicate directly with the activation client 40 via the communications network 12. The central validating server 20 will receive data information from the activation client 40 upon initial activation of the mobile device 30 by a user of the present invention. Such data information may include information such as first name, last name, address, social security, number, data of birth, drivers' license number, voting district, and the like. It is appreciated that the data information transferred to the central validating server 20 by the activation client 40 may vary greatly in different embodiments of the present invention, and should not be construed as being limited by the exemplary list above. This data information may be stored on the validating server 20 for future uses.

The central validating server 20 will also generate and transmit a unique code back to the activation client 40 via the communications network 12. This unique code may be comprised of letters, numbers, symbols, binary, or any other data capable of being verified by the central validating server 20 at a later time. The unique code may be encrypted with various cryptology methods known in the art. Preferably, the unique code will be unique to the mobile device 30 being activated.

The central validating server 20 will also be adapted to communicate directly with the mobile device 30 via the communications network 12. As described below, the central validating server 20 will receive data information from the smart phone and compare the data information to that which was received and stored from the activation client 40. The central validating server 20 will similarly receive the unique code from the smart phone and compare it to the unique code generated and sent to the activation client 40.

D. Activation Client

The activation client 40 may be comprised of any communications device through which communications are preferably established with the central validation server to aid with initial activation of the mobile device 30. The activation client 40 may be comprised of a server computer, cloud based computer, virtual computer, home computer, mobile device 30 or other computer system capable of receiving and transmitting data via IP networks and the telecommunication networks 12. As can be appreciated, a modem or other communication device may be required between the activation client 40 and the corresponding telecommunication networks 12. The activation client 40 may be comprised of any electronic system capable of receiving and transmitting information (e.g. voice data, computer data, etc.).

The activation client 40 is preferably located within a vendor's store, such as a store where smart phones are sold and initially activated for use. The activation client 40 may be comprised of a wide range of computing devices, including cash registers, handheld scanners, personal computers, laptops, tablets, and the like. Preferably, none of the data information or other data being transmitted using the activation client 40 will be stored in the memory thereof.

The activation client 40 communicates directly with the central validating server 20 via the communications network 12. The previously-described data information will originate at the activation client 40. Generally, this data information will be provided by the purchaser of the smart phone and entered directly into the activation client 40. The data information will then be transmitted via the communications network 12 to the central validating server 20. The activation client 40 will also receive the unique code from the central validating server 20.

The activation client 40 will preferably be adapted to both transmit and receive data via near field communication (NFC). After receipt of the unique code from the central validating server 20, the unique code will be transmitted to the smart phone. A wide range of methods may be utilized to effectuate the transfer of this data, including wired or wireless communications protocols. Preferably, the unique code will be transmitted from the activation client 40 to the mobile device 30 via NFC.

In an alternate embodiment of the present invention, the mobile device 30 may instead originate the data information for transfer to the validating server 20. In this case, the data information will be entered directly into the mobile device 30, which will transmit the data information to the validating server 20, which will then communicate the unique code back directly to the mobile device 30. The data information may then be entered into the activation client 40 along with the unique code, which is transferred back to the validating server 20 to establish the initial activation of the mobile device 30.

E. Mobile Device

The mobile device 30 may be comprised of any type of mobile computing device being used by an individual for data and identity verification purposes. For example, the mobile device 30 can be a smart phone, mobile laptop computer or tablet computer (e.g. IPAD®). The mobile device 30 may also be comprised of various other electronic devices capable of sending and receiving electronic data including but not limited to mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device 30 will preferably be adapted to communicate with the central validating server 20 via the communications network 12. The mobile device 30 may also include functionality to communicate with the activation client 40 via NFC. Additionally, the mobile device 30 is preferably adapted to communicate with a wide range of verification clients 50 as described below via any number of communications methods. The mobile device 30 will also preferably include a fingerprint scanner or a camera capable of acting as a fingerprint scanner. In certain embodiments, other biometric scanners may be incorporated into the mobile device 30, such as retina scanners.

The mobile device 30 will receive and store both data information and biometric information which is collected using the biometric scanner. The mobile device 30 will additionally store the unique code received from the central validating server 20 via the activation client 40. The biometric information will only be scanned once (upon activation), and stored, preferably in an encrypted state, within the mobile device 30's memory for use in verifying with various verification clients 50 as described below.

E. Verification Client

The present invention will aid a wide range of verification clients 50 in verifying various data and/or biometric information regarding an individual. In some embodiments, the mobile device 30 may act as the verification client 50, such as with a smart phone verifying an identity prior to allowing login to a banking application on the smart phone. In other embodiments, the verification client 50 may be comprised of a discrete computing device such as a handheld scanner or any of those previously described herein. The verification client 50 may also be comprised of such computing devices as electronic voting machines, vending machines, and the like.

F. Operation of Preferred Embodiment

Figure 3:
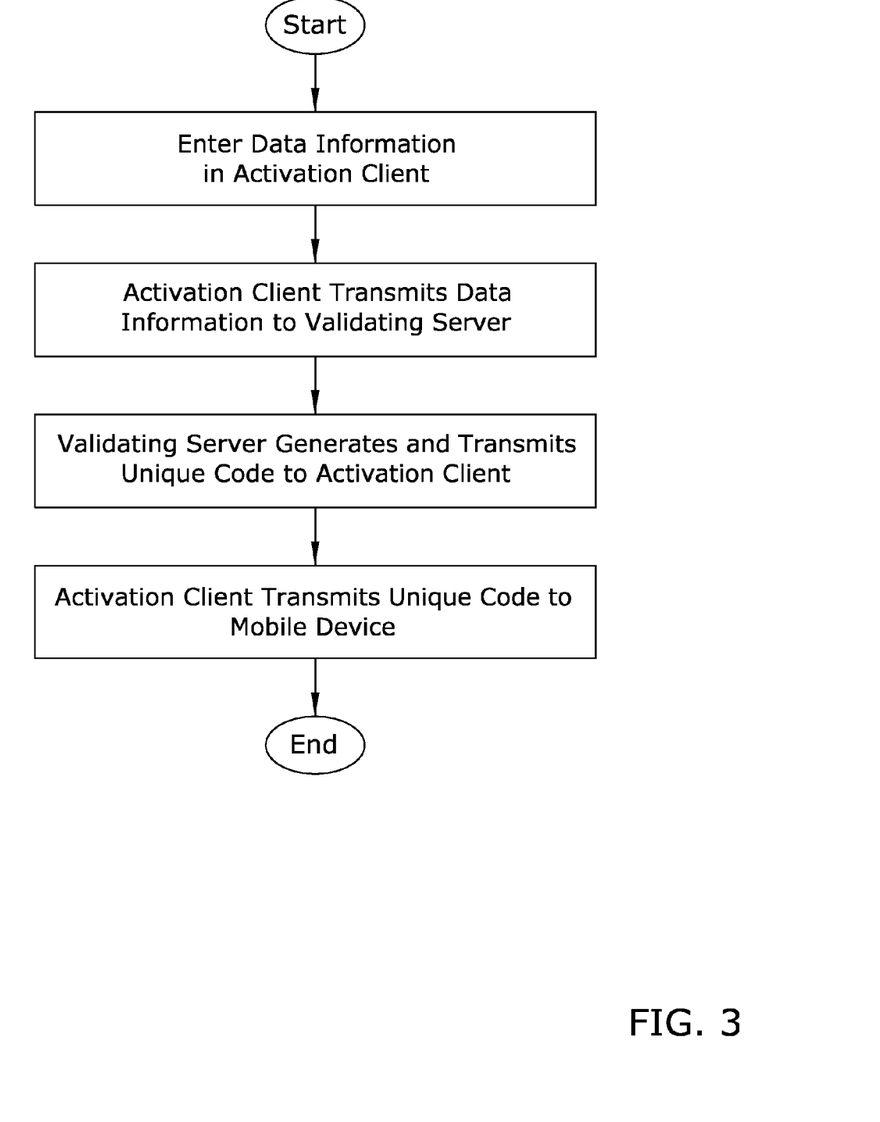
FIG. 3 is a first flowchart illustrating initial activation of the mobile device.
Figure 4:
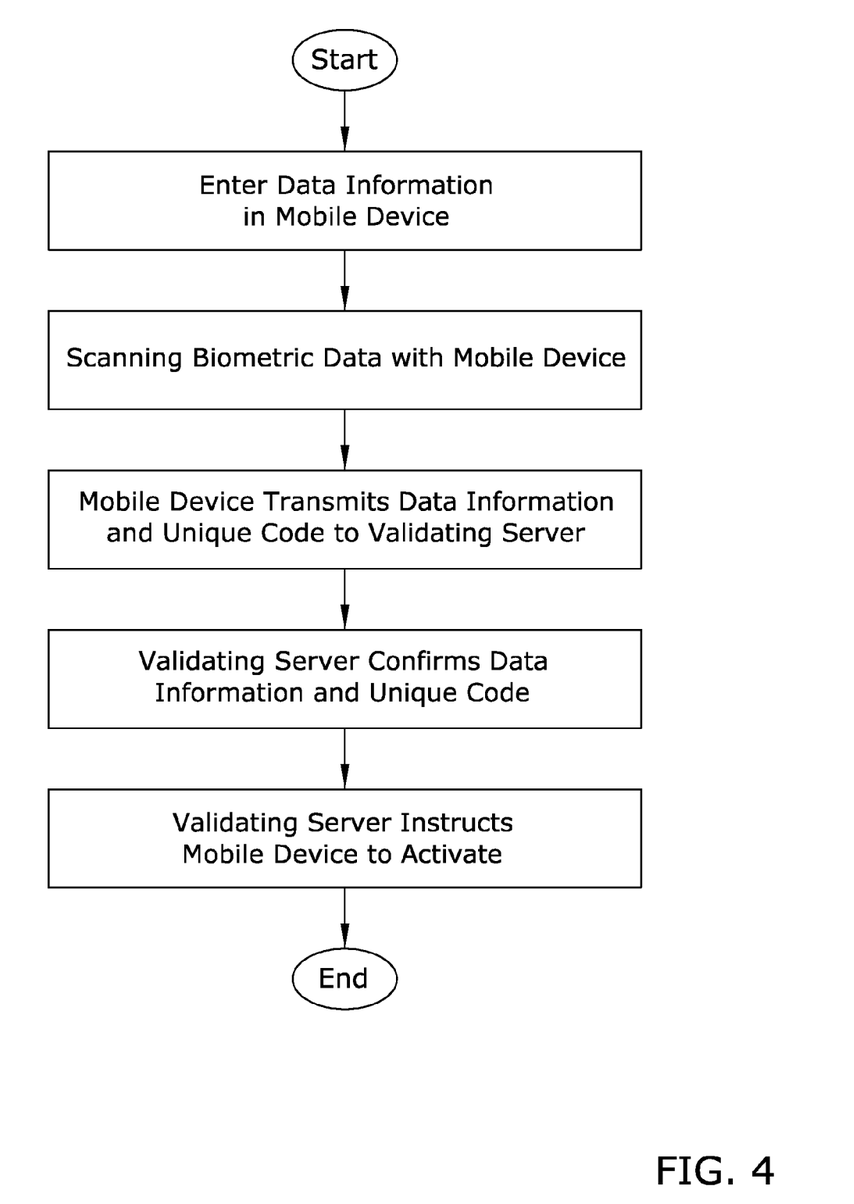
FIG. 4 is a second flowchart illustrating initial activation of the mobile device.

FIGS. 3 and 4 illustrate an exemplary method for initial activation of the mobile device 30. First, data information is entered into the activation client 40 and transmitted via the communications network 12 to the central validating server 20. The validating server 20 stores this data information, generates a unique code, and transmits the unique code back to the activation client 40 via the communications network 12. This unique code is transmitted to the mobile device 30 from the activation client 40, such as via NFC.

The mobile device 30 will then prompt the user for a biometric scan and may prompt for entry of the data information (in some embodiments, the data information may be transferred from the activation client 40 to the mobile device 30). The user will use the mobile device 30's biometric scanner to provide biometric information, which is stored within the memory of the mobile device 30. This biometric information is not transferred to, nor stored at, either the activation client 40 or the central validating server 20.

Upon verification and storage of the biometric scan, the mobile device 30 will transmit the unique code along with the data information to the central validating server 20. The central validating server 20 will validate both the unique code and the data information is correct, and then transmit an activation signal to the mobile device 30.

With the mobile device 30 being activated, it may be utilized to ease verification at various locations. For example, when purchasing alcohol, the mobile device 30 may provide a verification confirmation to a verification client 50 to easily verify the age of the owner of the mobile device 30. In another example, the mobile device 30 may be utilized to verify the identity and voting district of a voter with a verification client 50 at an electronic voting center. In yet another example, the mobile device 30 may be utilized to verify the identity of the owner of the mobile device 30 when financing a product, such as a new car. There are a wide range of applications for the systems and methods described herein to ease verification of data and/or biometric information when needed.

Figure 5:
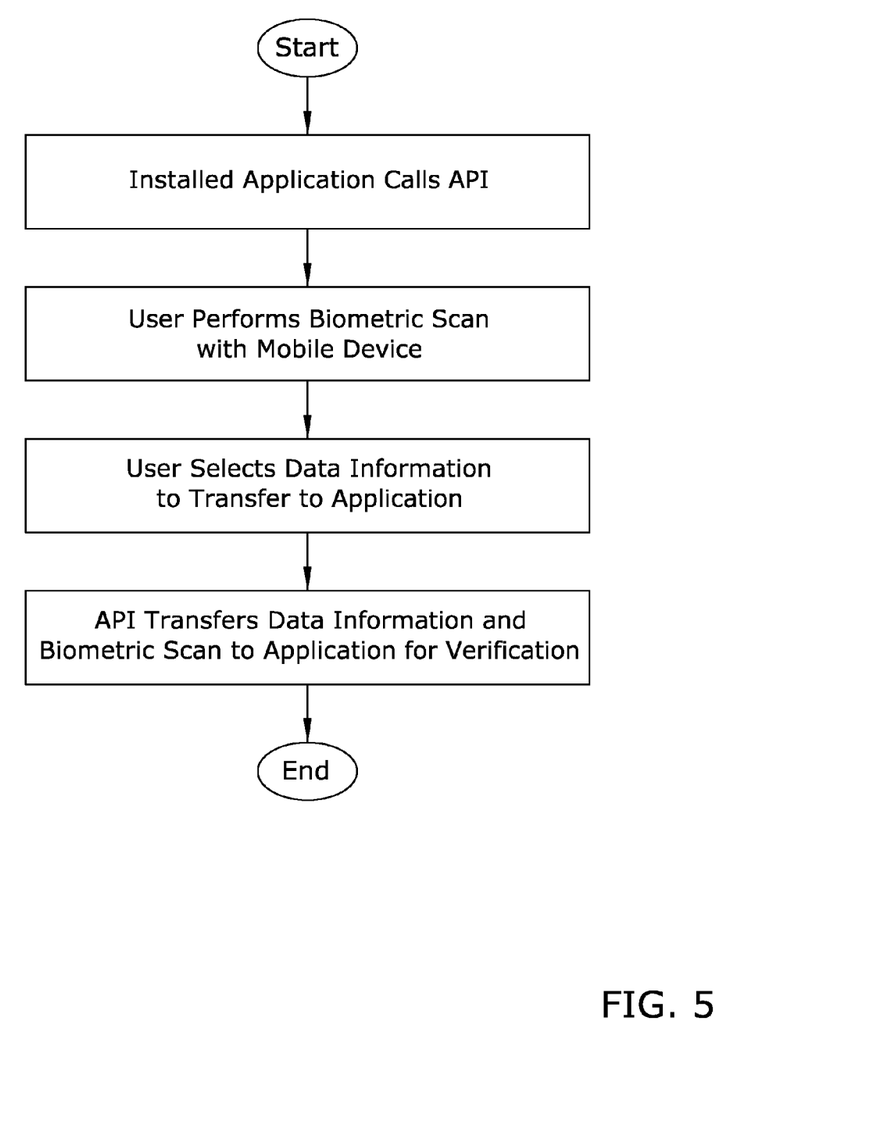
FIG. 5 is a flowchart illustrating verification using an installed application on the mobile device.

As shown in FIG. 5, in the case where the mobile device 30 acts as its own verification client 50 for purposes of verifying information for a native or installed application, the mobile device 30 will call its application programming interface (API), which will prompt the user of the mobile device 30 to provide biometric data via the biometric scanner to validate the user's identity. This biometric data will be compared to the biometric data previously stored during the activation processes. The user may then be prompted to restrict any other data information from being provided to that particular application. It is noted that, in some cases, if the user restricts information considered required by the program (i.e. age data information for an online gambling application), the application may decline verification. If all requisite data information and biometric data is verified, the application will continue.

Figure 6:
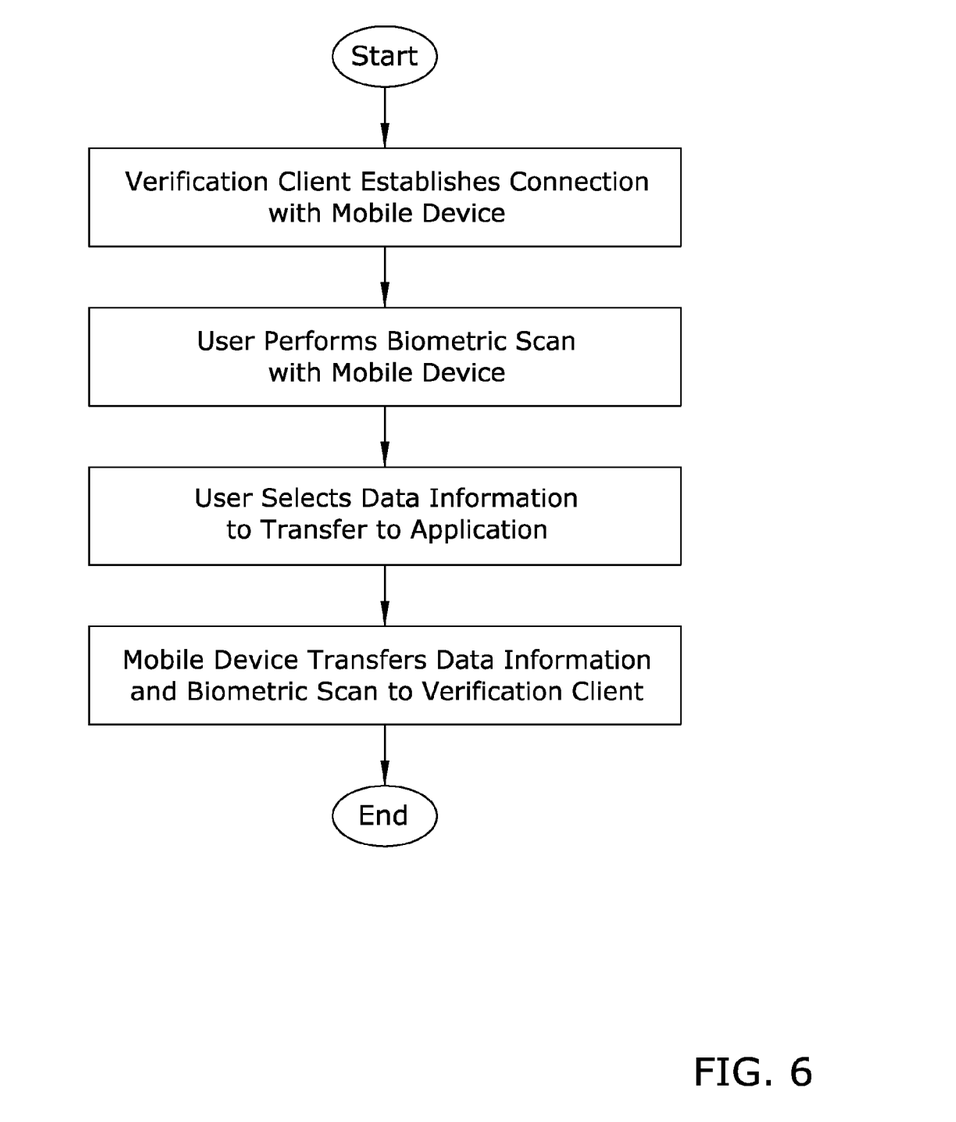
FIG. 6 is a flowchart illustrating verification using a verification client.

As shown in FIG. 6, in the case where the verification client 50 is a discrete device, the verification client 50 will establish communications with the mobile device 30, such as wirelessly through NFC, a communications network 12, or various other methods. The verification client 50 will connect to the mobile device 30, such as via Bluetooth, and call its API, in some cases using a temporary user id/password or other verification method to establish communication and access between the verification client 50 and the mobile device 30. Once a connection is established, the previously described methods for verification, including the selection of data information to be transferred, may be performed to verify information regarding the user to the verification client 50 using the mobile device 30.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network 12, such as the Internet.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the invention will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the present invention, suitable methods and materials are described above. Thus, the present invention is not intended to be limited to the embodiments shown, but is to be accorded the widest scope consistent with the principles and features disclosed herein.

The invention claimed is:

1. A method for data verification using a mobile device, comprising:
   providing a mobile device, wherein said mobile device includes a biometric scanner;
   storing data information on said mobile device;
   transmitting said data information to a central validating server;
   generating a unique code by said central validating server;
   storing said unique code on said mobile device;
   scanning biometric information with said biometric scanner of said mobile device;
   storing said biometric information on said mobile device;
   transmitting said data information and said unique code from said mobile device to said central validating server;
   verifying said data information and said unique code by said central validating server;
   activating said mobile device upon receipt of said mobile device of verification by said validating server;
   providing a verification device, wherein said mobile device and said verification device are distinct;
   connecting said verification device with said mobile device;
   transmitting at least a portion of said data information and said unique code from said mobile device to said verification device;
   transmitting said data information and said unique code from said verification device to said central validating server;
   verifying said unique code and said data information received from said verification device by said central validating server;
   transmitting verification from said central validating server to said verification device if said unique code and said data information received from said verification device are validated by said central validating server.

2. The method for data verification using a mobile device of claim 1, further comprising the step of providing an activation client.

3. The method for data verification using a mobile device of claim 1, wherein said data information is entered into said activation client.

4. The method for data verification using a mobile device of claim 3, further comprising the step of transmitting said unique code from said central validating server to said activation client.

5. The method for data verification using a mobile device of claim 4, further comprising the step of transmitting said unique code from said activation client to said mobile device.

6. The method for data verification using a mobile device of claim 1, wherein said mobile device is comprised of a smart phone.

7. The method for data verification using a mobile device of claim 1, wherein said mobile device is comprised of a tablet computer.

8. The method for data verification using a mobile device of claim 1, wherein said biometric information is comprised of a fingerprint scan.

9. The method for data verification using a mobile device of claim 1, wherein said biometric information is comprised of a retina scan.

* * * * *